US007232537B2

(12) United States Patent
Bullock

(10) Patent No.: US 7,232,537 B2
(45) Date of Patent: Jun. 19, 2007

(54) METHODS FOR MAKING SLIP RESISTANT FILE FOLDERS

(75) Inventor: Roddy McKee Bullock, Milford, OH (US)

(73) Assignee: Smead Manufacturing Company, Hastings, MN (US)

( * ) Notice: Subject to any disclaimer, the term of this patent is extended or adjusted under 35 U.S.C. 154(b) by 422 days.

(21) Appl. No.: 10/659,492

(22) Filed: Sep. 10, 2003

(65) Prior Publication Data

US 2004/0053765 A1 Mar. 18, 2004

Related U.S. Application Data

(62) Division of application No. 09/873,436, filed on Jun. 5, 2001, now Pat. No. 6,938,549, which is a division of application No. 09/463,229, filed on Jan. 21, 2000, now Pat. No. 6,273,470.

(51) Int. Cl.
*B29C 59/00* (2006.01)
*B29C 53/00* (2006.01)
*B65D 27/00* (2006.01)
*B65D 85/00* (2006.01)
*B42F 21/00* (2006.01)

(52) U.S. Cl. .................... 264/293; 229/67.1; 229/67.2; 40/359; 206/426; 264/299

(58) Field of Classification Search ................ 206/425, 206/449; 40/359; 264/293; 162/222; 229/67.1, 229/406
See application file for complete search history.

(56) References Cited

U.S. PATENT DOCUMENTS 1,585,237 A 5/1926 Doughty
2,052,623 A * 9/1936 Harby ........................ 493/331
2,062,436 A * 12/1936 Yawman ...................... 40/359
2,204,095 A * 6/1940 McLaren ................... 229/67.1
2,289,577 A * 7/1942 Jonas .................... 211/126.13
3,283,992 A 11/1966 Hanson et al.
3,524,583 A 8/1970 Gregory
3,643,363 A * 2/1972 Biro ............................ 40/359
3,885,729 A 5/1975 Fridlund et al.
4,053,057 A * 10/1977 Snowden ............... 211/126.13
4,487,520 A * 12/1984 Maier-Hunke et al. ....... 402/65
4,600,329 A * 7/1986 Ferreira-Godinho ......... 402/74
5,311,685 A * 5/1994 Wyant ......................... 40/359
5,720,427 A 2/1998 Kachel et al.
5,769,311 A * 6/1998 Morita et al. ............... 229/403
6,248,050 B1 * 6/2001 Boy ........................... 493/213
6,273,470 B1 * 8/2001 Bullock ....................... 281/29
6,938,549 B2 * 9/2005 Bullock ...................... 101/483

* cited by examiner

*Primary Examiner*—Christina Johnson
*Assistant Examiner*—Jeff Wollschlager
(74) *Attorney, Agent, or Firm*—Altera Law Group, LLC

(57) ABSTRACT

Methods for producing easily and securely gripped slip-resistant file folders, including file pockets and hanging folders. The methods include providing folder paper stock; conveying the folder paper stock in the process of folder manufacture; providing a curable slip-resistant material in a melt state; applying the slip-resistant material at predetermined areas of the folder paper stock; and curing the slip-resistant material; such that the slip-resistant portion comprises cured slip-resistant material. Another method includes providing folder paper stock; providing embossing dies in spaced, operable, mating relationship; positioning the folder paper stock appropriately in the embossing dies; applying force to at least one of the embossing dies so as to decrease the spaced relationship; and deforming the folder paper stock.

3 Claims, 8 Drawing Sheets

METHODS FOR MAKING SLIP RESISTANT FILE FOLDERS

This application is a divisional of and claims priority to U.S. Ser. No. 09/873,436 filed on Jun. 5, 2001, now U.S. Pat. No. 6,938,549 entitled Methods For Making Slip Resistant File Folders, which claims priority to Ser. No. 09/463,229, filed Jan. 21, 2000, now U.S. Pat. No. 6,273,470 issued Aug. 14, 2001.

This application is a divisional of and claims priority to U.S. Ser. No. 09/463,229 filed Jan. 21, 2000, now U.S. Pat. No. 6,273,470 entitled Slip Resistant File Folders, priority date Dec. 18, 1997.

FIELD OF THE INVENTION

This invention relates to improvements in file folders, expandable folders, hanging folders, and the like.

BACKGROUND OF THE INVENTION

File folders have become a necessity in today's modern offices and businesses. Such folders may be as simple as stiff, folded paperboard, often having predetermined cut out or raised areas for attaching labels or other identifying indicia. File folders, such as manila folders, are useful for storing paper and related articles in an orderly manner in file drawers or cabinets. Many improvements have been made to the simple file folder, including expandable folders that can hold a large amount of papers, reinforced edges for stronger, longer lasting use, and clasp means for positively securing the file contents so that enclosed papers stay organized and do not fall out.

Many variations of the simple file folder are known. For example "file pockets" are expandable file folders having fan-folded sides for higher capacity storing of papers. File pockets come in a variety of sizes, including letter and legal size. "Expanding files" are similar to file pockets, but generally have a flap attached that can be secured to a front cover to prevent papers from falling out the top of the file. Expanding files often have numerous pockets inside which are sometimes indexed for added organizational capability. Closely related to expanding files are expanding wallets, which generally have an elastic cord attached to the flap which can be used to secure the flap in a closed position.

In addition to simple file folders, file pockets, expanding files and expanding wallets, it is known to use hanging folders for receiving file folders and the like. Hanging folders are made for use in standard storage units such as file cabinets, desk drawers and the like. Hanging folders are generally formed of a sheet of heavy weight paper with a central horizontal fold which forms the folder's bottom and has open sides. Folds are provided in the file's top edges through which hanging rods are movably or immovably fixed. The ends of these rods are exposed and notched, enabling the file to hang on a complementary standard parallel file frame in office storage equipment, such as filing cabinets and desk drawers.

Improvements to hanging folders include providing the inner surfaces of the folded over portions at the top of each flap with uniformly spaced slots for insertion of labeling tabs. Reinforcing plastic film may be applied to the exposed edges to reduce wear as the file is moved in the frame or file drawer. This film may be applied with colored adhesive to provide a color coding system or a clear film may be applied over a colored surface by clear adhesive to achieve the same result. Hanging folders with strong, flat bottoms have been made to handle oversized or heavy contents. Other various improvements to hanging folders are exemplified in the art, including various means for attaching labeling, as well as adapting the hanging folder concept for a wide variety of articles, such as hanging loose-leaf ring binders.

One drawback to existing file folders and hanging folders is the relative difficulty in removing such folders from file drawers, file cabinets, and the like, especially when such folders are oversized, such as relatively full expandable folders or full flat-bottom (box-bottom) hanging folders. It is often necessary to remove a folder to inspect, remove, or add to its contents, and it is often necessary to remove an entire file pocket or hanging folder for similar reasons. Removal is generally accomplished by gripping the top edges of the folder and lifting it out of the drawer. However, it is difficult to grip the top of a very full, thick, folder to remove it from the file drawer without it slipping, possibly falling and spilling its contents. This is because the paper stock used for existing folders is generally very smooth, and somewhat slick, requiring the person removing the file to exert extremely high pressures to lift the folder. Even pulling a relatively thin file folder or hanging folder out of a full drawer is made more difficult by the pressure of adjacent files. Often it is necessary to use two hands to grip a folder for removal. This problem is especially pronounced for older persons, persons having arthritis, or persons otherwise being incapable of applying sufficient grip strength.

Accordingly, it would be desirable to have a slip-resistant file folder, hanging folder, and the like, that is easy to grip and remove from its drawer or cabinet.

Additionally, it would be desirable to be able to adapt an existing file folder, hanging folder, and the like, to be slip-resistant for easier removal from a drawer or cabinet.

Additionally, it would be desirable to be able to economically produce slip-resistant file folders, hanging folders, and the like.

SUMMARY OF THE INVENTION

Methods for producing easily and securely gripped slip-resistant file folders, including file pockets and hanging folders are disclosed. The methods include providing folder paper stock; conveying the folder paper stock in the process of folder manufacture; providing a curable slip-resistant material in a melt state; applying the slip-resistant material at predetermined areas of the folder paper stock; and curing the slip-resistant material; such that the slip-resistant portion comprises cured slip-resistant material. Another method includes providing folder paper stock; providing embossing dies in spaced, operable, mating relationship; positioning the folder paper stock appropriately in the embossing dies; applying force to at least one of the embossing dies so as to decrease the spaced relationship; and deforming the folder paper stock.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

Figure 1:
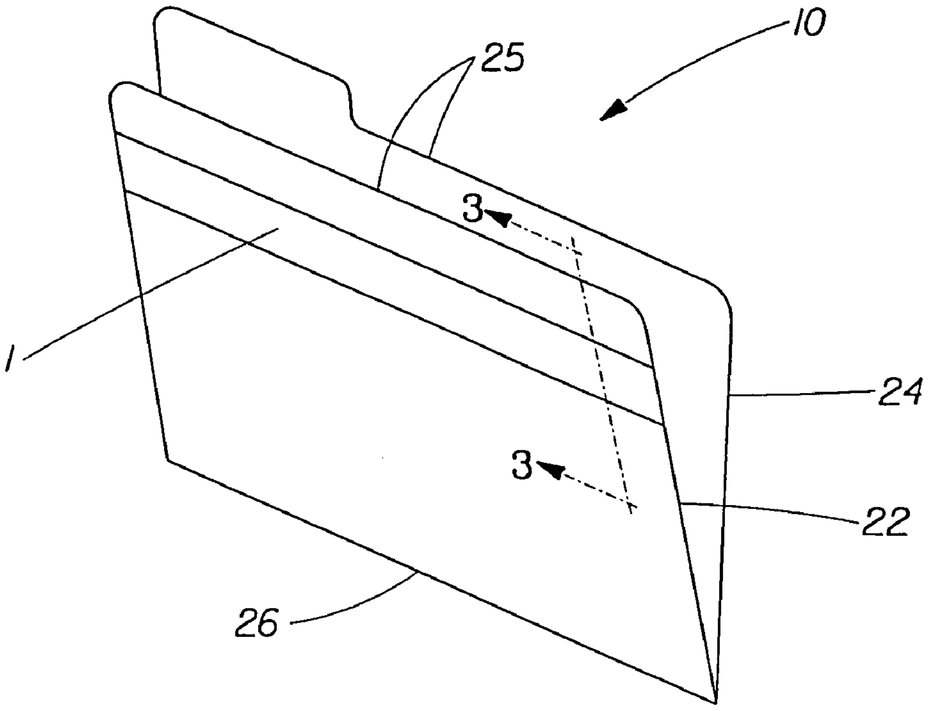
FIG. 1 is a perspective view of a typical file folder, such as a manila folder having a slip resistant portion disposed upon at least one flap.

As used herein, when used alone, the term “folder” encompasses all of “file folders”, “file pockets”, “expanding files”, “expanding wallets”, and “hanging folders” as well as other folding articles that may be stored in a file drawer or cabinet, such as hanging ring binders, bound presentation folders, and the like.

As used herein, the term “file folder” means folders such as manila, kraft, pressboard, or plastic, typically supplied in letter or legal size. File folders come in a variety of “points”, which denote the weight of the paper stock used for the folder. File folders are supplied with various improvements, such as color coding, undercut tabs for labeling, reinforcing strips along edges, and fasteners to hold papers attached in various positions. By way of example, a manila file folder suitable for the present invention is the Smead 152L heavy-weight 11 pt. manila folder, available from the Smead company, Hastings, Minn.

As used herein, the term “file pockets” means expandable pockets having fan-folded sides and a fan-folded bottom, useful for large files. File pockets have a larger capacity than file folders, and may be used in standard filing systems, including hanging files. By way of example, a file pockets suitable for the present invention is the Wilson Jones 64 series 3½ inch expansion COLORLIFE® file pocket, from the Wilson Jones Company, or the Smead 1524E Redrope® Pockets. File pockets are often reinforced to provide maximum durability and capacity.

As used herein, the term “expanding files” means expandable filing folders, generally having a fan-folded bottom, full fan-folded sides, and a fold-over flap that is used to securely close the file. By way of example, an expanding file suitable for the present invention is the 21-pocket Smead DR117A expanding file with flap, available from the Smead company.

As used herein, the term “expanding wallets” means expandable filing folders similar to expanding files. Expanding wallets generally have elastic cord tie flaps for securely closing a top flap. By way of example, expanding wallets suitable for the present invention include the Oxford Plus® 60343 3½ inch expansion reinforced wallets.

As used herein, the term “hanging folder” means folders designed for use with hanging file systems. Such folders come in many variations including box-bottom, expandable, color-coded, and reinforced-edge, durable designs. By way of example, hanging folders suitable for the present invention include standard size folders such as the Esselte Pendaflex® 4152 series (letter size) and 4153 series (legal size) folders; box bottom folders such as the Esselte Pendaflex® 4152X series (letter size) and 4153X series (legal size) folders; expanding file pockets such as the Smead 18H24ESS (letter size) and 18H26ESS (legal size) folders; and hanging expanding files such as the Globe-Weis GlobalFile® 85030 expanding hanging file. A further example of hanging folders of the type useful for the present invention is disclosed in U.S. Pat. No. 5,275,439 to Hawes, Jr. et al., issued Jan. 4, 1994.

As used herein, “high coefficient of friction” means a coefficient of friction between a folder and a person’s fingers that is sufficient to resist slippage of the folder from the person’s grip when lifting a folder out of a file drawer. It is acknowledged that sufficient friction will depend on a variety of factors, including a person’s grip and the weight of the folder, as well as other environmental factors such as relative humidity. For this reason, “high coefficient of friction” is not meant to denote any absolute number or level, but is generally substantially higher than the coefficient of friction between typical folder paper stock and a user’s fingers when gripping a folder from the top. It is otherwise simply descriptive in principle of the desired characteristic of a suitable material (or paper configuration) for use as the slip-resistant portion of the present invention. In other words, whether a material is applied as the slip resistant member, or the paper is deformed, e.g., as by embossing, the effect is an increase in the frictional force between the folder and the user’s fingers. The increase can be due to an actual increase in the coefficient of friction due to addition of a material such as a light tack adhesive, or it can be due to a change in normal forces due to a change in folder geometry, such as by embossing.

A typical embodiment of a folder 10 of the present is shown in FIG. 1, which shows a file folder 20. File folder 20 has a front flap 22 hingedly connected to a rear flap 24 at folder bottom 26 along a medial fold. In use, folder bottom 26 is disposed horizontally, generally parallel to top edges 25. According to the present invention, file folder 20 also has a slip-resistant portion 1 disposed on at least one flap, but preferably on both the front flap 22 and rear flap 24. Slip-resistant portion 1 can be disposed as a horizontal band of material affixed near top edges 25. As shown below, the purpose of slip-resistant portion 1 is to provide a region of the folder with a high coefficient of friction to allow easier slip-resistant gripping of the folder for lifting the folder from its drawer.

Slip-resistant portion 1 may comprise a variety of materials, configurations, patterns, and positions, but in general, the purpose of the slip-resistant portion is to provide a region of the folder having a high coefficient of friction between a user's fingers and the folder as it is being removed from a file drawer. For this reason, the slip-resistant portion can be comprised of a slip-resistant material, such as a light-tack adhesive that has a high coefficient of friction. A wide range of adhesives may be used, but in a preferred embodiment the slip-resistant portion comprises a permanently tacky pressure-sensitive adhesive. By "pressure sensitive" is meant that the adhesives of the invention are tacky to the touch at room temperature (e.g., about 20 degrees C.), as can be readily determined by a finger tack test, and can easily form a useful adhesive bond with the application of light pressure. Pressure-sensitive adhesives are commonly used for adhesive tapes and labels, often with release liners for ease of delivery and application. Pressure sensitive adhesives may be rubber-based or acrylic/acrylate-based, with or without tackifiers added to impart tack or stickiness. In a preferred embodiment the slip-resistant portion is applied in the hot melt state and allowed to cure to a light tack during folder manufacture. Typical recipes for such adhesives are shown in the Encyclopedia of Polymer Science and Engineering, Herman F. Mark, Ed., 1988, Vol. 13, under the heading Pressure Sensitive Adhesives and Products, which section is hereby incorporated herein by reference. In addition to the adhesive properties, the placement and pattern of the slip-resistant portion also contributes to its performance.

A currently preferred pressure sensitive adhesive for use as the slip-resistant portion of the present invention is a removable adhesive such as the pressure sensitive adhesive having a low tack utilized on Post-it® notes. For example, a suitable adhesive is an acrylate copolymer which is described in U.S. Pat. No. 3,691,140, issued Sep. 12, 1972 to S. F. Silver, assigned to the Minnesota Mining & Manufacturing Co. of St. Paul, Minn., and improvements thereof. The adhesive is described as having infusible solvent-dispersible, solvent-insoluble, inherently tacky, elastomeric copolymer microspheres consisting essentially of about 90 percent by weight of at least one alkyl acrylate ester and about 10 to about 0.5 percent by weight of at least one monomer selected from the group consisting of substantially oil-insoluble, water-insoluble, ionic monomers and maleic anhydride. The microspheres are prepared by aqueous suspension polymerization utilizing emulsifier in an amount greater than the critical micelle concentration in the absence of externally added protective colloids or the like. The disclosure of the above-mentioned Silver '140 patent is hereby incorporated herein by reference.

Improvements to acrylate copolymer adhesives include improvements to the processibility of the adhesive. In particular, such adhesives have been improved to take advantage of the procedural, economical and environmental advantages of a hot melt processible adhesive. For example, an adhesive suitable for use as the slip-resistant material of the present invention is an acrylic pressure sensitive adhesive which displays a superior balance of tack, peel strength and cohesive strength for hot melt processing as disclosed in U.S. Pat. No. 5,552,451, issued Sep. 3, 1996 to Everaerts et al., assigned to the Minnesota Mining & Manufacturing Co. of St. Paul, Minn., the disclosure of which is hereby incorporated herein by reference. The adhesive is described as a permanently removable, low melt viscosity acrylic pressure-sensitive adhesive having three components: (1) at least one lower alkyl acrylate having an alkyl group which comprises from about 4 to 12 carbon atoms, (2) at least one higher alkyl acrylate having an alkyl group which comprises from about 12 to 26 carbon atoms and (3) sufficient crosslinker to impart cohesive strength to the adhesive. Such removable pressure-sensitive adhesives, depending upon the viscosity, can be coated via any of a variety of conventional coating methods, such as roll coating, knife coating, hot melt coating, or extrusion.

In a preferred embodiment, the pressure sensitive adhesive used as the slip-resistant portion of the present invention has very light tack, or "stickiness". Additionally, it is believed to be advantageous to have a removable pressure sensitive adhesive having excellent shear strength, and reduced adhesive transfer to a person's fingers upon gripping and releasing a folder of the present invention. Such an adhesive is disclosed in U.S. Pat. No. 5,663,241 issued Sep. 2, 1997 to Takamatsu et al., assigned to the Minnesota Mining & Manufacturing Co. of St. Paul, Minn., the disclosure of which is hereby incorporated herein by reference. The disclosed adhesive comprises polyhydrazide to microparticles, producing an adhesive having excellent shear strength, and reduced adhesive transfer.

Alternatively, other high coefficient of friction polymeric materials, such as rubber-based adhesives (e.g., contact cement), or polymeric materials, for example low durometer polyurethane, may be applied in ways known in the art. Additionally, as shown below, the slip-resistant portion may be affixed in tape form to folders or formed by permanently deforming the flaps of the folder, such as by embossing. Whether affixed, applied, or formed by embossing, the slip-resistant portion is preferably an integral part of the folder. However, it is contemplated that a removable slip-resistant portion may be desirable, such that it may be removed by the user if unwanted. A slip-resistant portion comprising removable double-back tape may be removed if desired.

Slip resistant portion 1 can also be formed integrally with the folder by mechanical methods such as embossing. Embossing can be accomplished by pressing the folder between embossing dies, such as those described with reference to FIG. 13 below. Embossing is believed to advantageously increase the frictional force between the folder and a user's fingers by providing ridges or other such deformations for gripping. Further advantages of embossing are described with respect to the FIGS. below.

Figure 2:
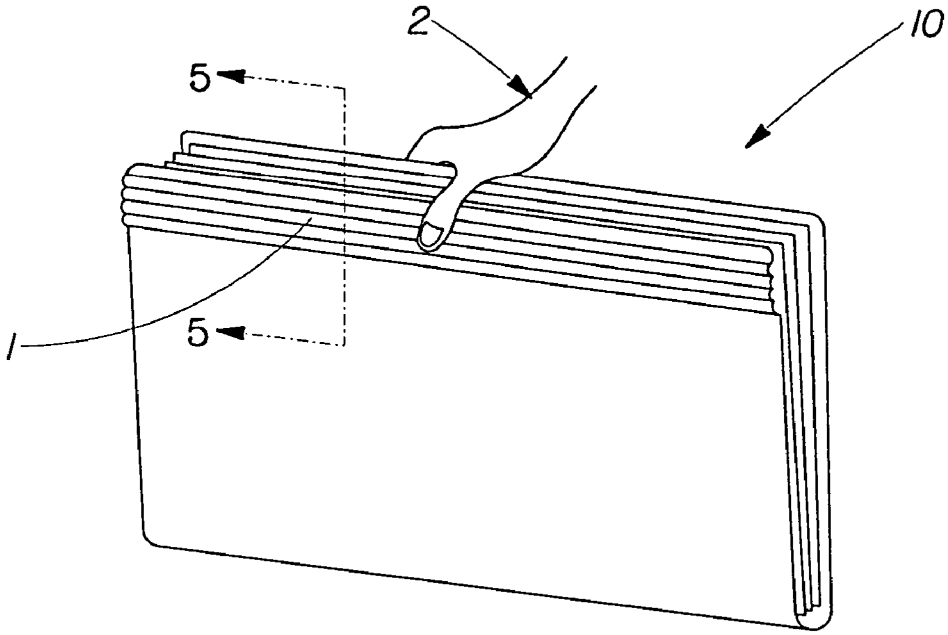
FIG. 2 is a perspective view of a person gripping a folder of the present invention at the top for removal such as by lifting out of a drawer or cabinet.

As shown in FIG. 2, the advantage of the present invention is that the folder 10, especially a thick folder or a hanging folder with many papers enclosed, may be gripped easily and securely for removal from its drawer or cabinet. As shown, slip-resistant portion 1, here shown as embossed ridges, is preferably positioned such that as a person's hand 2 grips the folder from the top, the user's fingers (not shown) and thumb contact the slip-resistant portion 1. In this manner, the high coefficient of friction allows the person 2 to lift the folder 1 without as tight a grip as would be necessary without slip-resistant portion 1.

In one embodiment, slip-resistant portion 1 can be affixed as a narrow band of material near the top edge of either or both the front and rear flaps of a folder. By "near the top edge" is meant within normal reach of a person's thumb or fingers when grasping a folder from the top, for example to lift it out of a drawer. In particular, a band approximately 6-25 mm (¼-1 inch) wide in an area 20-80 mm (about 1-3 inches) from the top edge of the folder flap is currently considered optimal. The band need not extend the whole width of the folder, but should at least span the central portion of the width. In general, as shown in FIG. 2, as a person grips a folder the thumb contacts one flap, while the fingers contact the opposing flap. Having a slip-resistant portion on both flaps assures that both the thumb and fingers contact areas of high coefficient of friction, making gripping easier. In certain embodiments, however, it is contemplated that having a slip-resistant portion on only one flap may be desirable.

Figure 3:
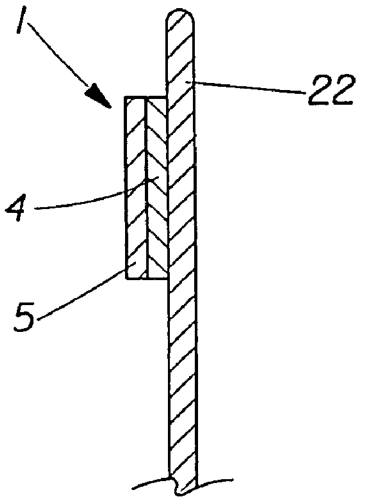
FIG. 3 is a partial cut away view along Section 3-3 shown in FIG. 2, showing a slip-resistant portion in the form of a slip-resistant member affixed to a flap of the folder.

As shown in FIG. 3, slip-resistant portion 1 may be any material 4 that has a high coefficient of friction which is applied or affixed as a layer to front flap 22 or rear flap 24 (not shown). In a preferred embodiment, material 4 is a light-tack pressure-sensitive adhesive applied in a uniform layer as a horizontal stripe or band near the top edges of folder 10. By way of example, suitable light-tack adhesives include adhesives of the type and tack used on Post-it® notes. Such an adhesive is tacky enough to give a high coefficient of friction between a persons fingers and the folder, but not so tacky as to be a nuisance during normal use of the folder. Person's skilled in the art will recognize that in addition to the examples provided above (i.e., adhesives disclosed in U.S. patents assigned to the Minnesota Mining and Manufacturing Co.), a wide range of adhesives from numerous sources could be used or adapted for use as a slip-resistant portion. The examples given, therefore, are to be exemplary and not limiting.

Slip-resistant portion 1 may be discontinuous, such as stripes or dots in a regular or random pattern, or a continuous network of interconnected beads or lines of adhesive, for example. By varying the amount and placement of slip-resistant material, the overall tackiness of slip-resistant portion 1 may be varied. If desired, a release strip 5 may be supplied covering the light-tack adhesive, as shown in FIG. 3. In this manner, the end user may activate the slip-resistant feature at will by removing all or part of the release strip 5.

Figure 4:
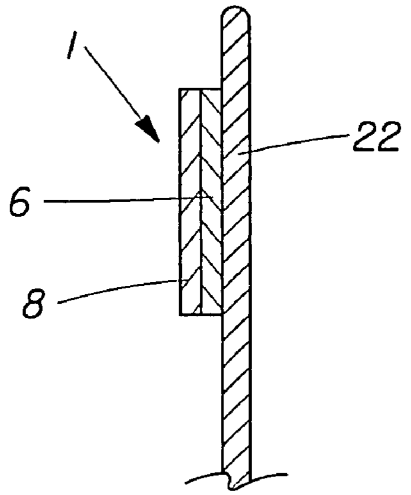
FIG. 4 is a partial cut away view, similar Section 3-3 shown in FIG. 2, showing another embodiment of a slip-resistant portion in the form of a slip-resistant member affixed to a folder.

If light-tack adhesive, or other pressure sensitive adhesive, is used for slip-resistant portion 1, it may be applied and cured in a continuous process during manufacture of the folder 10 as described below with reference to FIGS. 10-11. However, it is possible to adapt existing folders to folders of the present invention. For example, as shown in FIG. 4, one method of producing a folder of the present invention is to add strips of light-tack adhesive in tape form to an existing folder 10. As shown, a first strip of tape 6, such as a ¾-inch wide strip of 3M Scotch® double-coated tape 665 is applied to one flap, such as front flap 22. This tape, having adhesive on both sides, could be used alone, with the outwardly-facing side being of high coefficient of friction serving as the slip-resistant portion. However, the tack may too great, so to make a light-tack slip resistant portion, a second strip of tape 8 having a light-tack may be affixed to the first layer 6, such that the light-tack side is outwardly facing from the folder. A preferred second strip 8 is ¾-inch 3M Scotch® Removable Magic® 811 tape which is advertised as having the same self-stick adhesive as Post-it® notes. Alternatively, by way of example, second strip 8 may comprise Post-it® 652 correction and cover-up tape, with the tacky side outwardly facing. Alternatively, existing folders may be adapted by simply applying a layer of reusable adhesive from a suitable glue stick, such as Scotch® Restickable Adhesive Glue Stick, Cat. No. 06314, available from 3M Consumer Stationery Division, St. Paul, Minn.

Figure 5:
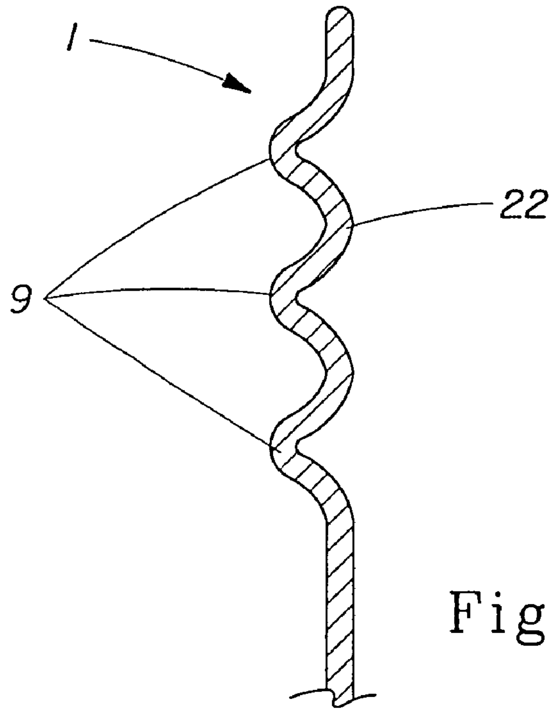
FIG. 5 is a partial cut away view depicting another embodiment of a slip-resistant portion, namely a raised, embossed area.
Figure 15:
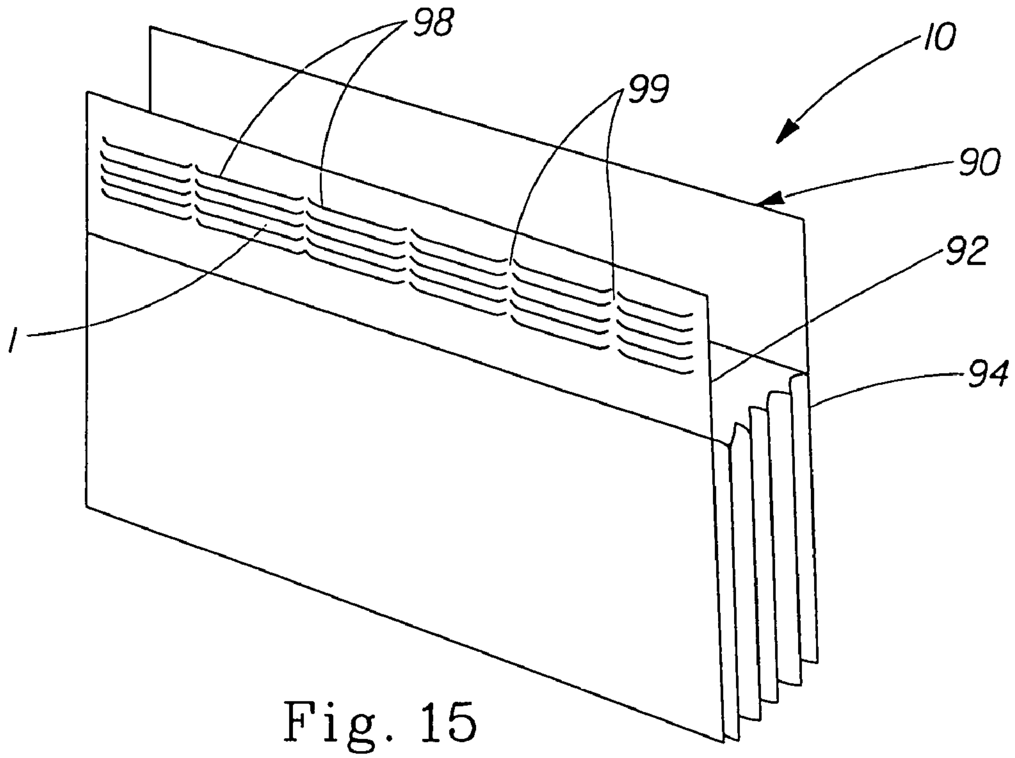
FIG. 15 is a perspective view of a file pocket showing another embodiment of a slip-resistant portion of the present invention.
Figure 16:
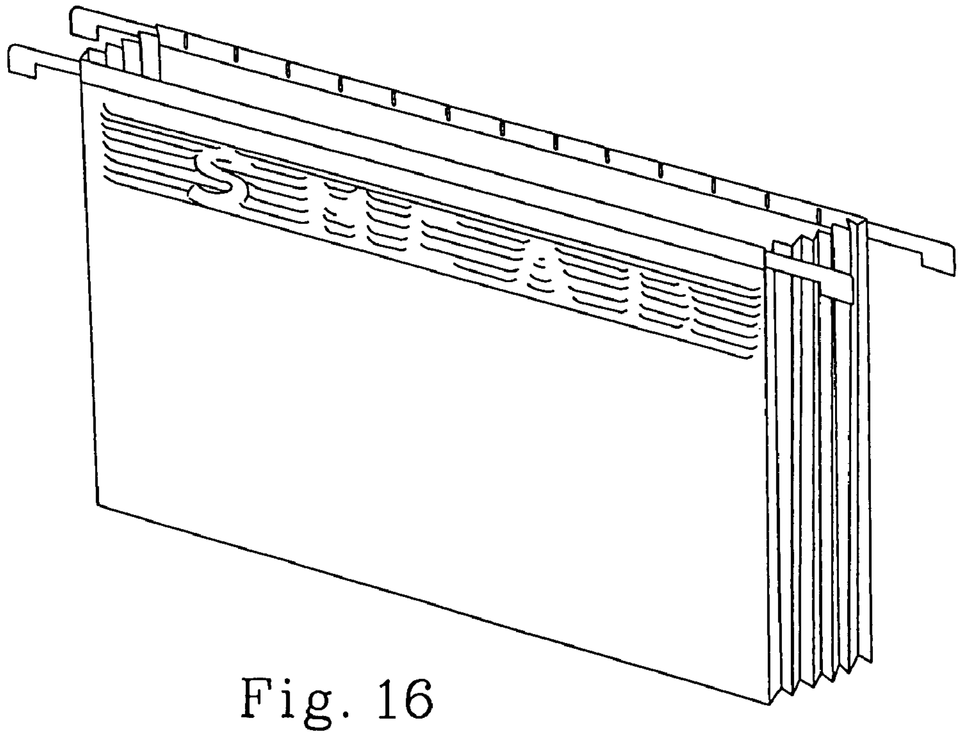
FIG. 16 is a perspective view of a file pocket showing another embodiment of a slip-resistant portion of the present invention.

While one embodiment of slip-resistant portion 1 comprises a material applied or affixed to the front or back flaps of a folder 10, it need not be so. For example, as shown in cross-section in FIG. 5, slip-resistant portion 1 may be made by mechanically deforming the paper structure to form raised bumps or ridges. One method of deforming is embossing, in which the paper stock is pressed between forming dies to be permanently deformed in the desired pattern. One pattern, as shown in FIG. 5, is a plurality of horizontal, generally parallel ridges and valleys 9. The advantage of embossing, rather than applying adhesive, is that the resulting slip-resistant portion is not tacky to the touch, eliminating any possible negative effects of having such a tacky surface. Persons skilled in the art will recognize that the possible patterns for embossing are virtually limitless. Certain preferred patterns are shown in FIGS. 15 and 16. Therefore, the configuration depicted in FIG. 5 is exemplary, and not limiting.

While the raised ridge-like structures shown in FIGS. 5, 15, and 16 are preferably formed by embossing the paper stock during folder manufacture, persons skilled in the art will recognize that other methods and techniques may be employed with similar results. For example, the paper may be formed in the wet state and molded into the configurations shown. Furthermore, a separate paper or plastic strip with embossed or molded ridges may be joined to a folder to form slip-resistant portion 1. For example, a thin plastic strip of relatively rigid polypropylene may be molded with suitably placed ridges, and adhered to the folder in a suitable location. Therefore, embossing to form ridges or ridge-like structures is meant to be exemplary, even preferred, but not limiting.

Figure 6:
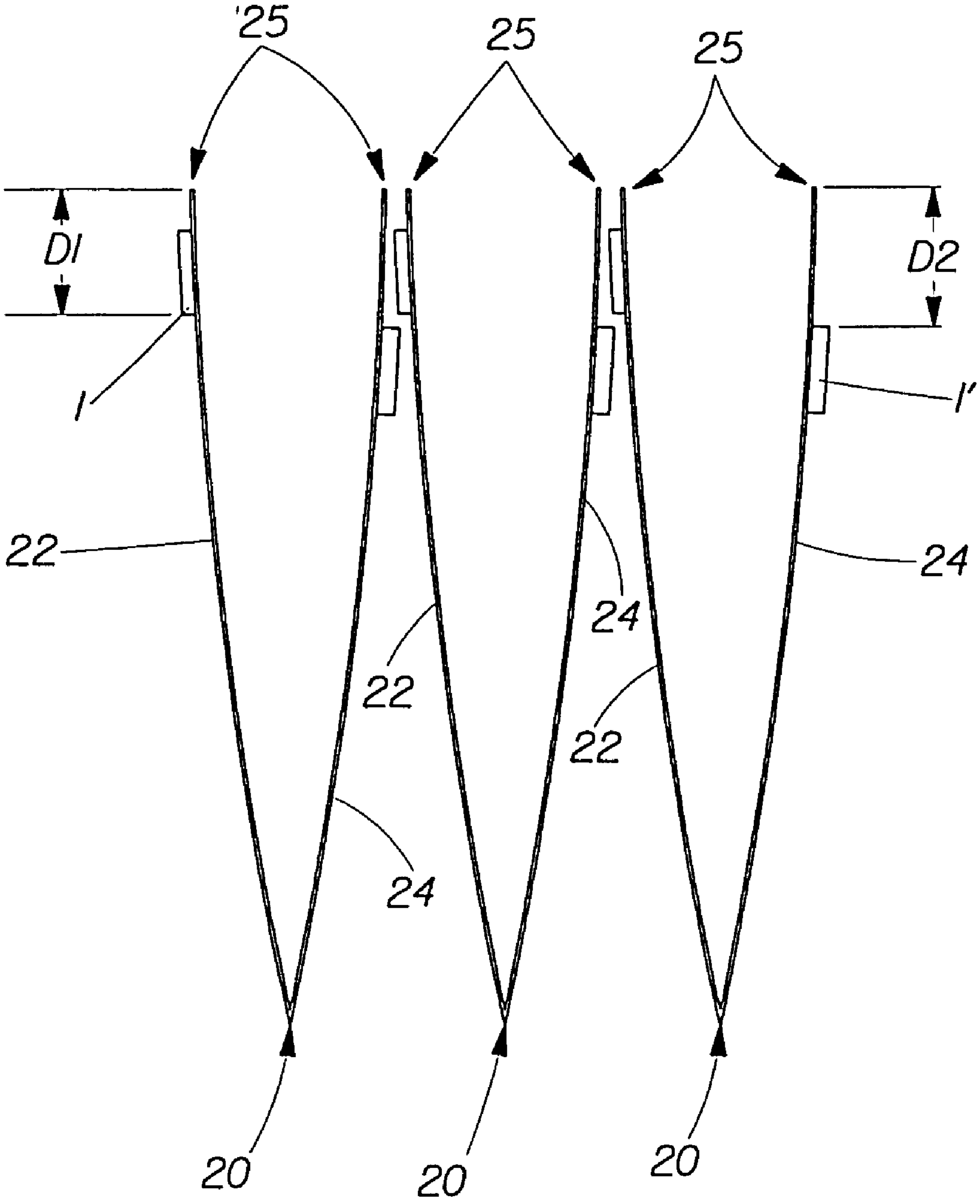
FIG. 6 is a side view of three file folders of the present invention showing vertically-offset slip resistant portions.

When pressure-sensitive adhesive is used, the slip-resistant portion 1 on the front flap 22 is preferably vertically offset a certain distance from the slip-resistant portion 1' on the rear flap 24. In this regard, the "vertical" direction refers to the direction orthogonal to a top edge 25 of a folder flap, generally in the plane of the respective folder cover. As shown in FIG. 6, a vertical offset prevents the slip-resistant portions on the rear flap of one folder from interfering with the slip resistant portion on the front flap of an adjacent folder in a drawer, possibly causing them to stick excessively to one another. FIG. 6 shows three folders 20 as they may be situated in relation to one another in a file drawer. Although file folders are shown, the principle shown holds for all types of folders, including file pockets and hanging folders. The lower edge of slip-resistant portion 1 on front flap 22 is a distance D1 from top 25, whereas the upper edge of slip-resistant portion 1' on rear flap 24 is a distance D2, greater than D1, from top 25. In this manner, slip resistant portions of adjacent folders do not contact one another, possibly causing unwanted sticking of adjacent folders.

It is contemplated that if vertically-offset slip-resistant portions are used, as shown in FIG. 6, the slip-resistant portion on the front flap should be the one closer to the top. This is because the front flap is usually contacted by the thumb of a person removing it, while the rear flap is contacted by the fingers. Since the fingers are longer than the thumb, they are more suited for the longer distance associated with the longer distance D2.

Figure 7:
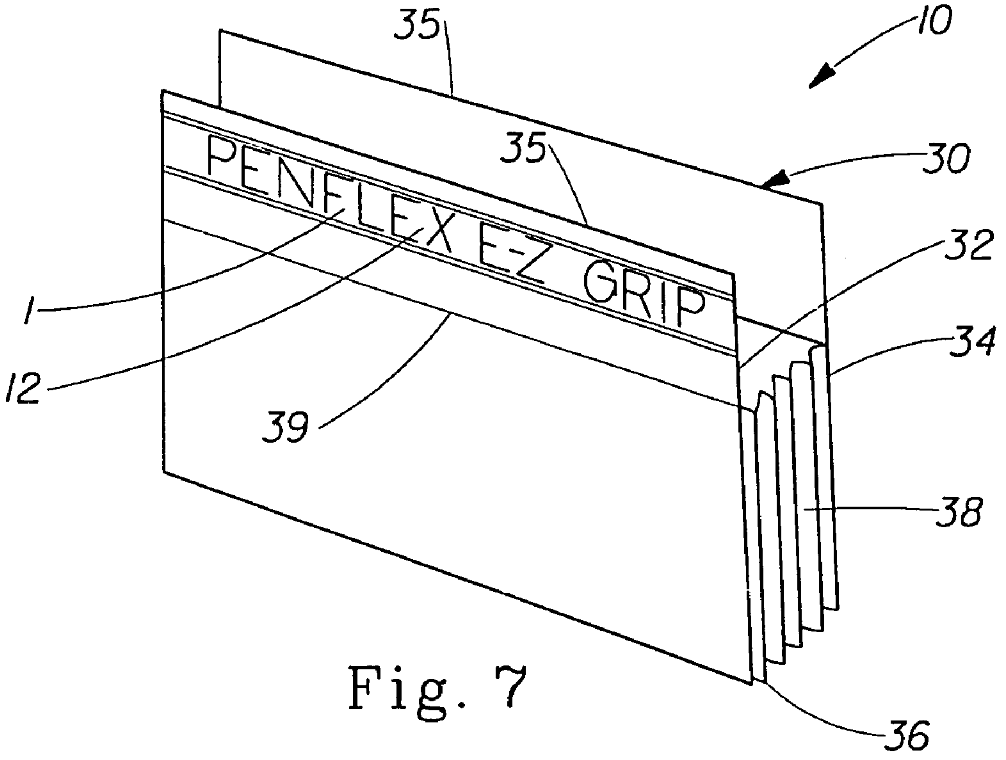
FIG. 7 is a perspective view of a file pocket showing another embodiment of a slip-resistant portion of the present invention.

The folder 10 shown in FIG. 7 is exemplary of a file pocket 30. File pocket 30 comprises a front flap 32, and a rear flap 34, connected at the bottom by folder bottom 36 comprising expandable fan folds, and partially along the sides by expandable side members 38. File pockets have top edges 35 on front and rear flaps that typically stand higher than the enclosed papers, with a scored line 35 for bending down the top edges to gain easier access to enclosed papers. Such a configuration makes gripping a full folder for removal more difficult since upon gripping, the top flaps tend to bend inward into somewhat of a wedge shape that is more difficult to grip.

File pocket 30 is shown in FIG. 7 with another preferred embodiment for slip-resistant portion 1, namely a slip-resistant portion that comprises recognizable designs or indicia 12, such as the manufacture's name. By varying the material and method of application of slip-resistant portion 1, visible, aesthetically pleasing designs or indicia 12 may be applied, including letters, numbers, or other decorative or utilitarian markings. For example, printing methods known in the art may be employed to apply colored adhesives or high coefficient of friction polymeric materials in virtually limitless designs, locations, and amounts.

Figure 8:
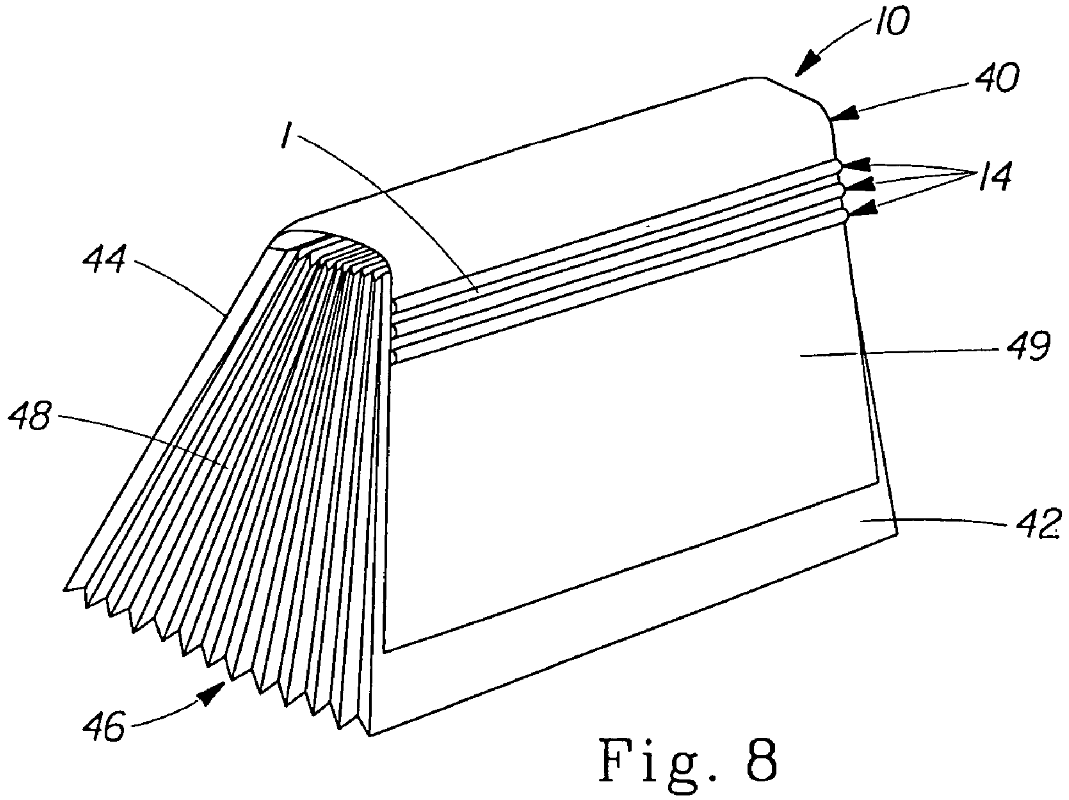
FIG. 8 is a perspective view of an expanding file showing another embodiment of a slip-resistant portion of the present invention.

FIG. 8 depicts an expanding file 40, which along with expanding wallets, is distinguished primarily by its cover flap 49. Expanding file 40 has a front flap 42, a rear flap 44 connected at the bottom by expandable folder bottom 46 and along the sides by expandable sides 48. Cover flap 49 is typically secured in a closed position by a tie string, elastic cord, Velcro® hook and loop fasteners, or other securement means (not shown). Expanding files are often stored in file drawers or cabinets, and are often stored in a hanging folder. To aid in lifting expanding file 40 from the top, slip-resistant portion 1 is applied, shown in this embodiment as parallel beads 14 of light-tack pressure-sensitive adhesive or high coefficient of friction polymeric material. Any number of beads, or stripes, of material 14 may be applied, and they may or may not be continuous along the full width of the folder. For example, stripes or beads of material may be applied in discontinuous segments as desired.

Figure 9:
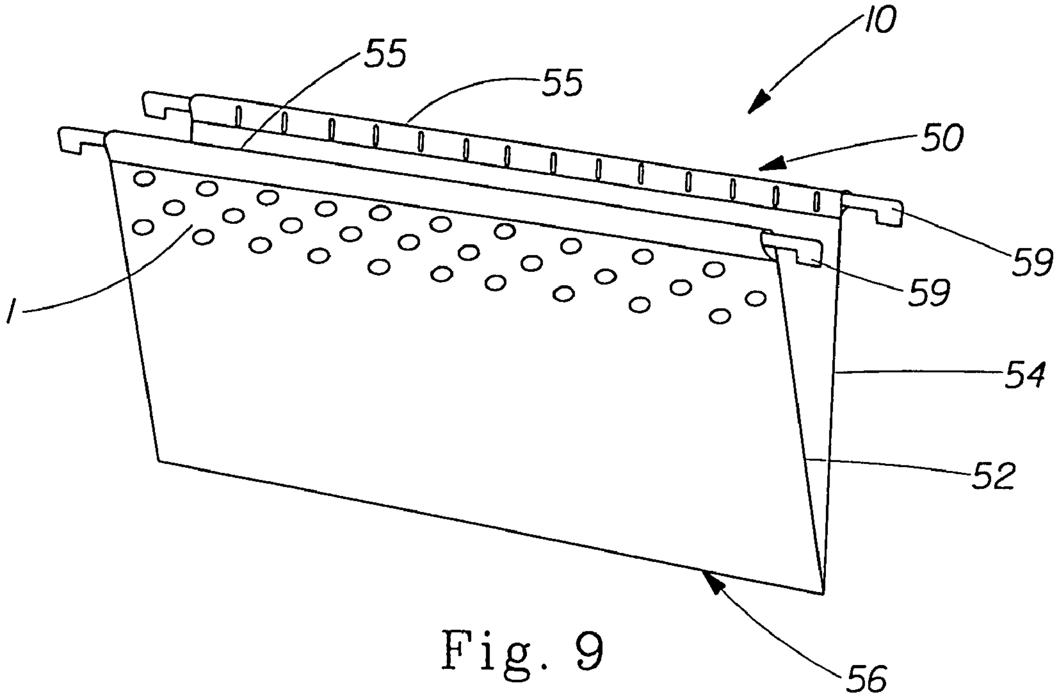
FIG. 9 is a perspective view of a hanging folder showing another embodiment of a slip-resistant portion of the present invention.

The folder 10 shown in FIG. 9 is exemplary of a hanging folder 50. Hanging folder 50 generally comprises a front flap 52 connected to a rear flap 54 by folder bottom 56, typically comprising a medial fold. Hanging folder 50 is primarily distinguished by hanging rods 59, which are movably or immovably fixed to top edges 55. The ends of rods 59 are exposed and notched, enabling the file to hang on a complementary standard parallel file frame in filing drawers or cabinets. As shown in the embodiment depicted in FIG. 8, slip-resistant portion 1 may be applied in a discontinuous manner, for example in a regular pattern of spaced apart dots. The dots may be a separate material, such as fine-grit abrasive paper affixed by adhesive. In general, however, the dots are preferably comprised of light-tack adhesive or high coefficient of friction polymeric material applied by any suitable manner during manufacture of folder 10.

The slip-resistant portion embodiment shown in FIG. 9 may also represent raised bumps formed by embossing the paper stock in the area of the slip resistant portion. One desirable embodiment contemplated is to form a pattern of closely-spaced raised bumps with light-tack adhesive disposed in the non-raised areas surrounding the bumps. For example, a pattern of embossed "dimples" could be superposed on a pattern of adhesive such that the raised bumps do not have adhesive on them. A slip-resistant portion of this type would not feel tacky to the touch, but upon applying pressure to the raised bumps, they could collapse, so that a person's fingers would then contact the adhesive disposed around the bumps. In this manner, the tackiness would not be "activated" until needed by the user. Alternatively, the bumps need not be collapsible; the persons finger tips could simply press in around the bumps, contacting the slip-resistant material.

The slip-resistant portion shown in FIG. 9 may also represent holes, or slits, formed by very deep embossing, or by die punching. Deep embossing which actually causes penetration of the flap to form raised ridges may be provided as long as the flap integrity is maintained. Likewise, holes or slits made by die cutting may provide sufficient friction to act as a slip-resistant portion without the need for adhesives or polymeric materials.

The slip-resistant portion 1 shown in FIG. 9 may also represent an embodiment wherein slip-resistant portion 1 comprises a paper or plastic strip having molded-in bumps, holes, or other raised areas. The paper or plastic strip can be made separately by methods known in the art, and then joined to the folder to form a folder of the present invention. For example, thin strips of injection molded polypropylene could be formed and adhered to the folder.

Hanging folders come in a wide range of sizes and configurations, all of which may benefit by the improvement of the present invention. For example, in FIG. 10, a flat bottom, or box-bottom, hanging folder 60 is shown. Box-bottom hanging folder 60 generally comprises a front flap 62 connected to a rear flap 64 by a flat, horizontal folder bottom 66. Box-bottom hanging folder 60 has hanging rods 69, which are movably or immovably fixed to top edges 65. Sides 68 are often not present, but if present they may be expandable, and are often reinforced for durability. As shown in the embodiment depicted in FIG. 10, slip-resistant portion 1 may be comprised of a continuous network of interconnected lines 16 of slip-resistant material. Person's skilled in the art will recognize that the variations in continuous networks of interconnected lines are virtually limitless, and the embodiment shown is exemplary and not limiting.

Figure 10:
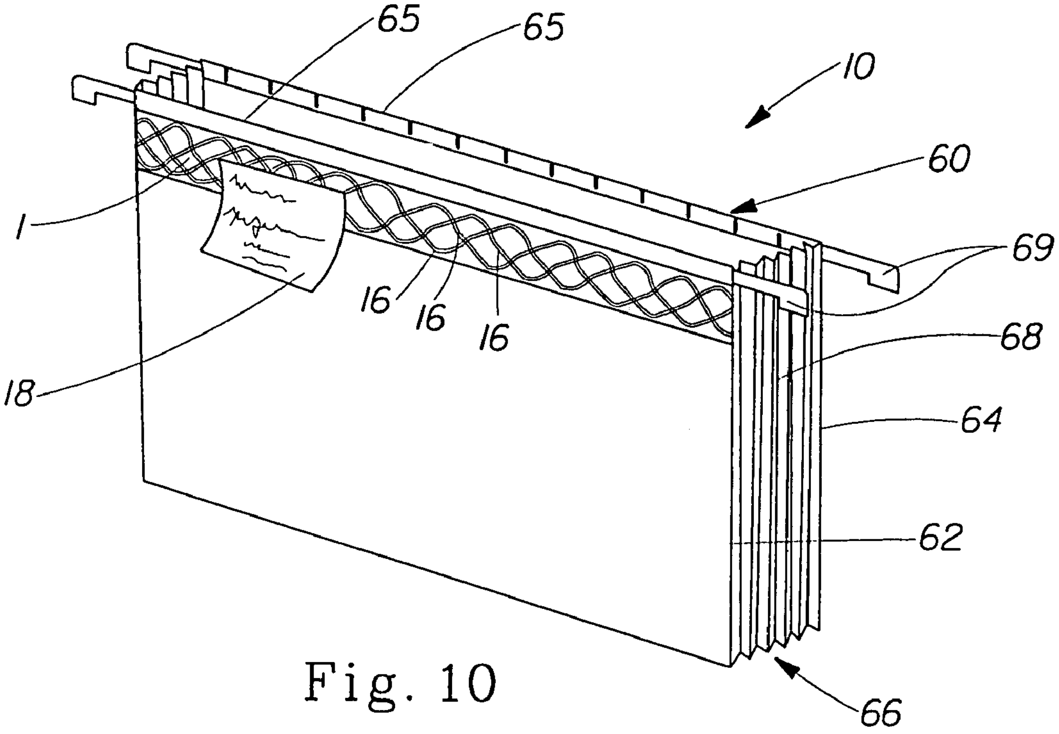
FIG. 10 is a perspective view of a flat-bottom hanging folder showing still another embodiment of a slip-resistant portion of the present invention.

Also shown in FIG. 10 is another beneficial advantage of the present invention. When slip-resistant portion 1 is applied as a light tack adhesive, such as an adhesive similar to the adhesive used on Post-it® notes, the slip-resistant portion 1 may serve a note-posting function. Notes 18 may be conveniently and removably stuck to folder 10 on the slip-resistant portion 1. When used for this function, it may even be desirable to place the light-tack adhesive on other parts of the folder 10, including on the inside.

Often reinforcing plastic film is applied to the top edges of folders. For example, hanging folders have reinforced plastic laminates folded with the paper stock enclosing the hanging rods, which serve to make the hanging folder more durable and wear resistant. One embodiment of the present invention contemplated is to combine the reinforcing laminate material of such folders with the slip-resistant portion 1 of the present invention. In such an embodiment plastic materials with a high coefficient of friction could be chosen as the reinforcing laminate material at the top edges of the folders. By doing so, the slip-resistant portion is "built-in" to a material having a separate primary function, thereby eliminating or reducing any costs associated with adding a separate material for slip-resistant material 1.

In an alternative embodiment, a separate member, such as an injection molded plastic strip can be preformed and affixed to the flaps of a folder. For example, a thin plastic strip can be molded to have raised ridges, bumps, or other gripping surfaces. The strip can then be joined to the folder by methods known in the art. Thus, an existing folder can be easily converted to a slip resistant file folder by the application of the molded strip to the folder, such as by adhesive.

As stated above, one method for applying slip-resistant portion 1 is to manually apply light-tack adhesive tape to an existing folder 10. However, commercially viable processes are preferred, such as a rotogravure printing process, schematically depicted in FIG. 11. Other printing processes and configurations known in the art may be used as necessary for particular manufacturing considerations, but the rotogravure process is described here as a preferred method. In general, such processes apply an adhesive or polymeric material in the melt state which is subsequently cured or dried to a substantially solid layer. By "melt state" is meant hot melt as well as liquid state material temporarily having low viscosity to allow for application by printing, spraying, extrusion, or other application methods known in the art.

Figure 11:
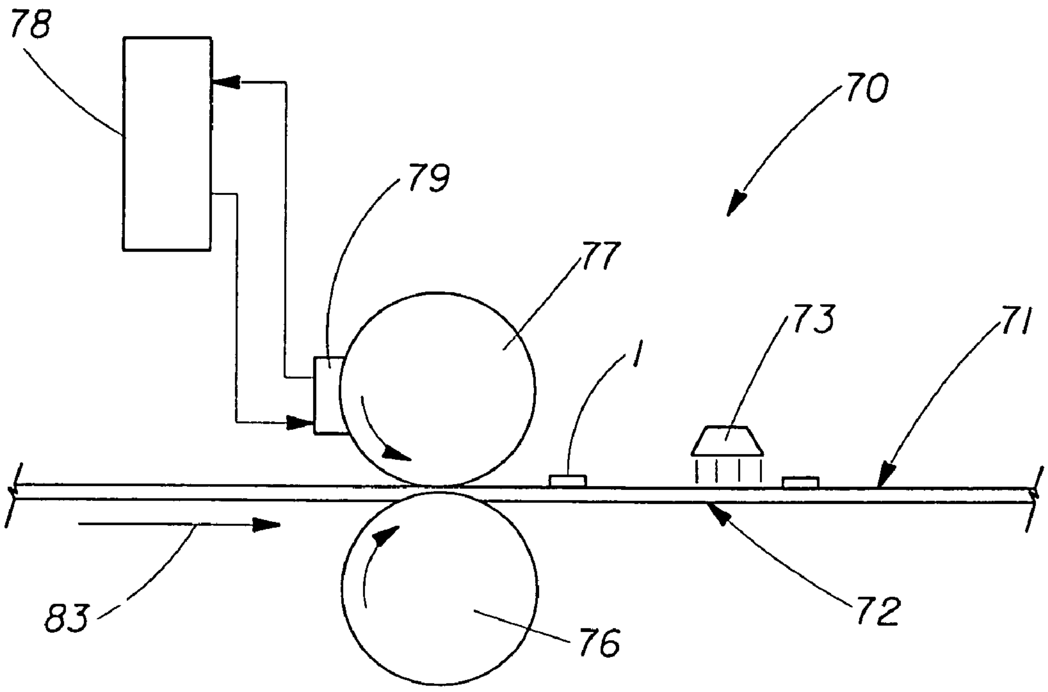
FIG. 11 is a schematic illustration of an apparatus and process for producing folders of the present invention.

As shown in FIG. 11, folder paper stock 71 may be conveyed on a manufacturing line, such as conveyor 72 in a generally flat-out configuration during a continuous manufacturing process 70. While being conveyed in such a process, the paper stock is passed to a heated rotogravure printing station comprising a backing roll 76 and engraved roll 77, at which point a curable slip-resistant material, such as a light-tack, hot melt processible adhesive, is applied to one surface of the folder paper stock in a predetermined area and pattern. The slip-resistant material is then cured, dried, or otherwise substantially solidified to form the slip-resistant portion 1. For example, curing station 73 may be positioned to cure by UV radiation or IR radiant heat, depending on the particular slip-resistant material used. Other compositions, such as high coefficient of friction polymers may be applied in a liquid polymer state in similar fashion, then cured or dried by suitable means known in the art to form slip-resistant portion 1.

During the printing process, the slip-resistant material, is supplied to a heated supply tank 78 and pumped to the heated doctor application head 79 by a suitable metering pump. It is generally desirable to maintain constant temperature during the process; therefore, it is desirable to continually circulate the melted composition between the supply tank and the application head while maintaining an adequate amount in the reservoir. The heated doctor application head supplies the slip-resistant material to the engraved roll, the surface of which is engraved with the desired pattern for slip-resistant portion 1.

In operation the engraved roll is loaded to the backing roll to force the paper stock into contact with the engraved roll. The backing roll can be any material that meets the process requirements such as natural rubber, synthetic rubber or other compressible surfaces. Loading pressures can vary, depending on paper stock thickness, composition thickness, and processing speeds.

If necessary, post-application processing for curing or otherwise substantially solidifying the slip-resistant material, such as UV curing, radiant heat drying, or other steps may be employed. Specific processing steps necessary for particular melt processible adhesives are known in the art and the steps disclosed may be modified, added to, or otherwise changed in ways that do not depart from the scope of the present invention. For example, melt processing comprising extrusion may be advantageously employed for certain adhesives or polymers.

Figure 12:
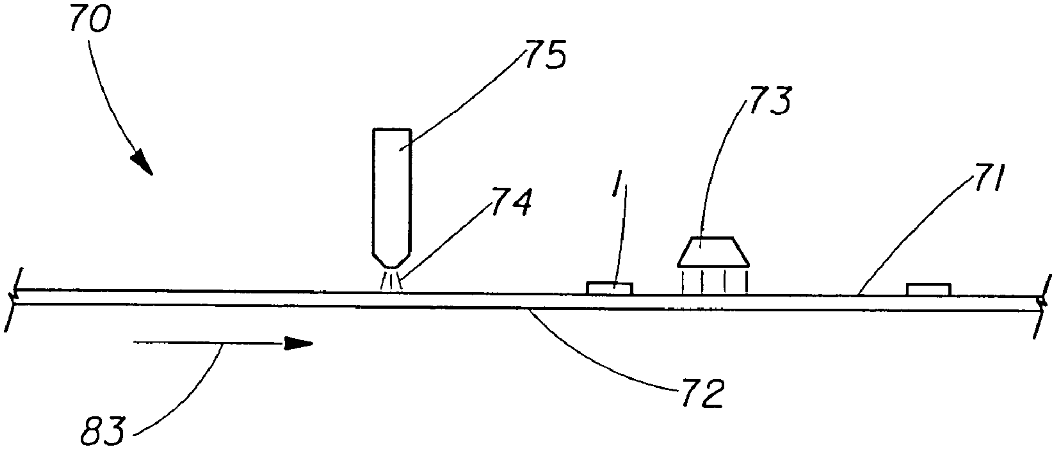
FIG. 12 is a schematic illustration of an alternative apparatus and continuous process for producing folders of the present invention.

Additionally, continuous layers of slip-resistant material, such as light-tack adhesives or high coefficient of friction liquid polymer materials, may be applied by spraying in predetermined patterns, for example by the process schematically depicted in FIG. 12. Again, folder paper stock 71 may be conveyed on a manufacturing line, such as endless conveyor 72 in a generally flat-out configuration during a continuous manufacturing process 70. A spray nozzle 75, or other suitable die, may be set up in position to intermittently spray a pattern of curable adhesive 74 or other curable polymeric material at predetermined positions, according to the various embodiments of the present invention. Further processing to cure, such as UV curing, radiant heat trying, and other advantageous processing steps may be employed as necessary for specific processes and equipment. As well, other spray processes and techniques may be used without departing from the scope of the present invention.

Figure 13:
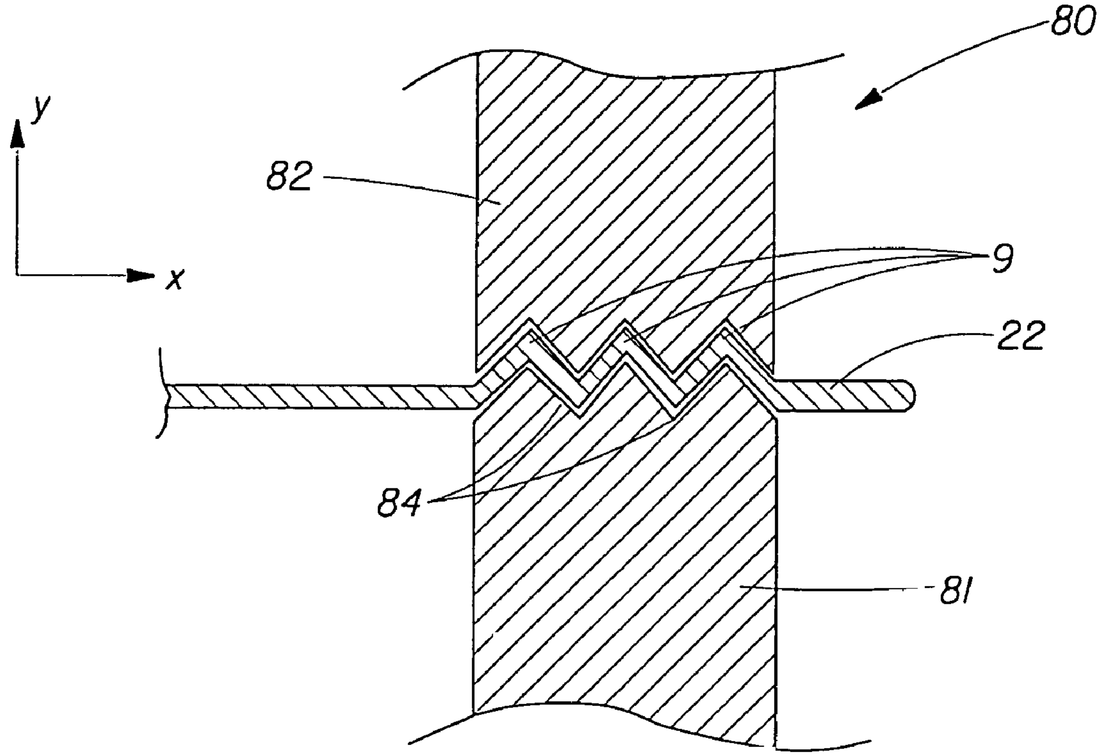
FIG. 13 is a schematic illustration of an alternative apparatus for producing folders of the present invention.

Permanent mechanical deformation can be accomplished by the use of opposing, mating dies, such as embossing dies 80 shown in FIG. 13. Many methods known in the art for embossing, stamping, or otherwise pressing paperboard can be used to form the ridges and valleys 9 that make up the slip resistant portion 1. In FIG. 13, an upper die 82, and a lower die 81 in operative, spaced relationship. The dies may be operative in a linear, reciprocating relationship essentially in the y-axis such that they operate in a stamping motion. Teeth 84 mate in a male/female relationship to effect the deformation of the paperboard of flap 22. In this type of embossing, each flap 22 could be placed between dies 81, 82, pressed or stamped, and then removed. Alternatively folded or flat paper stock could be fed continuously on a manufacturing line as dies 81, 82 operate in a repetitive, timed, cyclical motion to emboss the folders during continuous manufacturing.

Figure 14:
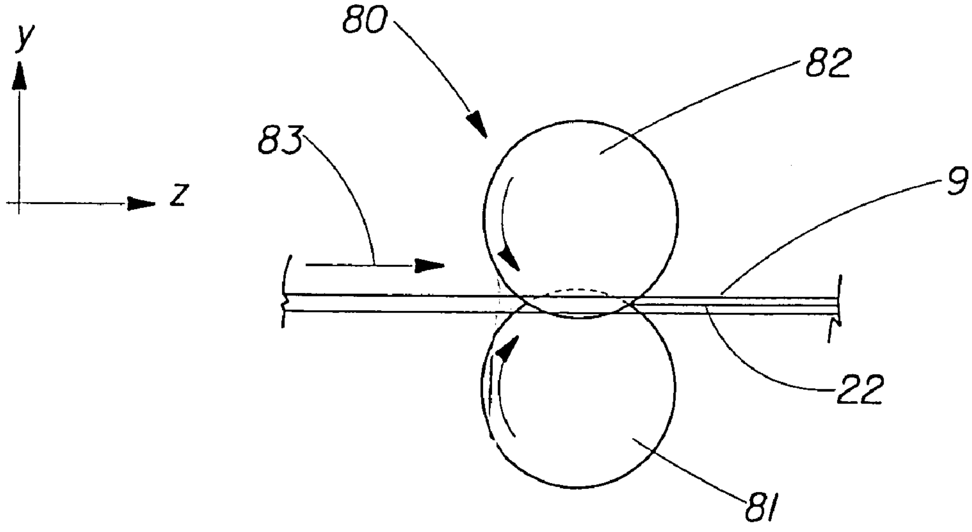
FIG. 14 is a schematic illustration of an alternative process for producing folders of the present invention.

FIG. 14 shows schematically another method of continuous embossing. Embossing dies 80 are in the form of mating ridged rollers 81, and 82 that can have the general cross section as dies 80 of FIG. 13. As paper stock for flap 22 is conveyed in the manufacturing process, for example in the z-direction as shown in FIG. 14, it moves through the mating rollers, becoming embossed in a continuous fashion.

The apparatus depicted schematically in FIG. 14 provides for high speed embossed ridges and valleys, and can be carried out by the apparatus shown and described in U.S. Pat. No. 5,691,035 issued Nov. 25, 1997 to Chappell et al. and hereby incorporated herein by reference. In particular, it is possible to modify the mating dies in ways that impart unique patterns of ridges and undeformed regions to form slip resistant portions 1. For example, by utilizing embossing dies in the form illustrated in FIG. 36 of the aforementioned Chappell et al. patent, a slip resistant portion 1 generally as shown in FIG. 15 can be formed. As shown in FIG. 15, slip resistant portion 1 is comprised of spaced sets of raised ridges 98 separated by undeformed portions 99. Undeformed portions 99 can be made various dimensions such that they provide structural support to flap 92, while ridges 98 provide for a high coefficient of friction for slip resistance.

In like manner, dies 80 can be modified to provide for other patterns of ridges and undeformed regions. In one embodiment, as depicted in FIG. 16, the undeformed regions can be shaped in the form of indicia, including letters, numbers, logos, and other identifying indicia.

While the above description contains many specificities, these should not be construed as limitations on the scope of the invention, but rather as illustrative of exemplary and preferred embodiments thereof. Many other variations are possible without departing from the spirit and scope of the invention as disclosed. For example, additional folds of flap material near top edges may be sufficient to form a slip-resistant portion. Accordingly, it is intended to cover in the appended claims all such variations, changes, and modifications that are within the scope of this invention.

What is claimed is:

1. A method of making a slip-resistant hanging folder of paper stock, said folder having front and back sides and top edges, and when assembled, support bars running along said top edges for hanging, the method comprising the steps of:

(a) providing folder paper stock;

(b) providing embossing dies in spaced, operable, mating relationship;

(c) positioning said folder paper stock appropriately in said embossing dies;

(d) applying force to at least one of said embossing dies so as to decrease the spaced relationship at a place on said front and back sides spaced from said top edges;

(e) deforming said folder paper stock in first and second spaced apart places along the surface of said folder paper stock with said embossing dies;

(f) attaching said support bars along said top edges; and (g) folding said folder paper stock such that said first and second deformed places are located on exterior surfaces of said front and back sides of said hanging folder, so that said deformed places form finger gripping locations on the exterior surfaces of said hanging folder near said top edges and below said support bars.

2. The method of claim 1 further including the step of locating said first and second deformed places on different portions of said hanging folder so that from said front side to said back side the deformed places are asymmetrical.

3. The method of claim 2 further including the step of applying first and second deformed places horizontally across said exterior surfaces of said front and back sides of said hanging folder and at different non-overlapping positions so that adjacent hanging folders can nest together.

* * * * *